(12) United States Patent
Ross, II et al.

(10) Patent No.: US 8,781,973 B1
(45) Date of Patent: Jul. 15, 2014

(54) EVENT MARKETING AUTOMATED SYSTEM

(75) Inventors: Bellverie E. Ross, II, Middletown, DE (US); Dean F. Eastburn, Lincoln University, PA (US); Daniel C. Devoll, Lincoln University, PA (US); Kelly C. Laird, Wilmington, DE (US); David T. Gulian, Newtown Square, PA (US); Theresa C. Hendrickson, Lakeville, MN (US)

(73) Assignee: Bank of America Corporation, Charlotte, NC (US)

( * ) Notice: Subject to any disclaimer, the term of this patent is extended or adjusted under 35 U.S.C. 154(b) by 3346 days.

(21) Appl. No.: 10/948,719

(22) Filed: Sep. 24, 2004

(51) Int. Cl.
*G06Q 20/00* (2012.01)

(52) U.S. Cl.
USPC .......... 705/64; 705/16; 705/17; 705/18; 705/19; 705/20; 705/22; 705/23; 705/24; 705/25; 705/39; 235/379; 379/91.01; 379/91.02; 902/2

(58) Field of Classification Search
CPC .................................................. G06Q 20/00
USPC ...................................................... 705/14, 64
See application file for complete search history.

(56) References Cited

U.S. PATENT DOCUMENTS

| | | | |
|---|---|---|---|
| 5,845,263 A * | 12/1998 | Camaisa et al. | 705/27 |
| 6,064,986 A | 5/2000 | Edelman | |
| 6,064,987 A | 5/2000 | Walker et al. | |
| 6,135,349 A | 10/2000 | Zirkel | |
| 6,330,548 B1 | 12/2001 | Walker et al. | |
| 6,336,104 B1 | 1/2002 | Walker et al. | |
| 6,442,529 B1 * | 8/2002 | Krishan et al. | 705/14 |
| 6,587,841 B1 | 7/2003 | DeFrancesco et al. | |
| 6,629,081 B1 * | 9/2003 | Cornelius et al. | 705/30 |
| 6,684,189 B1 | 1/2004 | Ryan et al. | |
| 6,752,313 B1 * | 6/2004 | Caviles et al. | 235/375 |
| 7,103,563 B1 * | 9/2006 | Voisin et al. | 705/14.54 |
| 7,103,576 B2 * | 9/2006 | Mann et al. | 705/64 |
| 7,233,960 B1 * | 6/2007 | Boris et al. | 707/104.1 |
| 7,310,611 B2 * | 12/2007 | Shibuya et al. | 705/26 |
| 7,349,871 B2 * | 3/2008 | Labrou et al. | 705/26 |
| 2001/0047326 A1 | 11/2001 | Broadbent et al. | |

(Continued)

FOREIGN PATENT DOCUMENTS

| | | |
|---|---|---|
| CA | 2301793 A1 * | 3/1999 |
| WO | WO 01/46889 A2 | 6/2001 |
| WO | WO 02/47001 A2 | 6/2002 |
| WO | WO 02/073363 A2 | 9/2002 |

OTHER PUBLICATIONS

Thaneus, A., "Open M and Visual M Help Centra Speed Delivery of Electronic Banking Services", M Computing, vol. 4, No. 5, pp. 7-8, Dec. 1996.

Nakajima, A. et al., "Multimedia Communication and Collaboration for Remote Loan Contracting", Conference: IEEE GLOBECOM 1996, Communications: The Key to Global Prosperity. Conference Record (Cat. No. 96cH35942), vol. 2, pp. 882-887.

(Continued)

*Primary Examiner* — James A Reagan
(74) *Attorney, Agent, or Firm* — Banner & Witcoff, Ltd.; Michael A. Springs

(57) ABSTRACT

In a method of processing customer applications at an event, an application is received from a customer on a customer interface computer. The data in said application is verified on the customer interface computer and encrypted. The encrypted data is transmitted wirelessly to a portal computer via a private wireless network, and then transmitted to a processing computer system for approval of the application.

10 Claims, 4 Drawing Sheets

(56) References Cited

U.S. PATENT DOCUMENTS

| | | |
|---|---|---|
| 2002/0029279 A1* | 3/2002 | Campbell et al. .............. 709/229 |
| 2002/0038248 A1* | 3/2002 | Mager et al. ..................... 705/14 |
| 2002/0055904 A1 | 5/2002 | Mon |
| 2002/0072974 A1 | 6/2002 | Pugliese, III et al. |
| 2002/0095454 A1* | 7/2002 | Reed et al. ..................... 709/201 |
| 2002/0103749 A1 | 8/2002 | Agudo et al. |
| 2002/0138414 A1 | 9/2002 | Baker, IV |
| 2002/0198822 A1 | 12/2002 | Munoz et al. |
| 2003/0036993 A1 | 2/2003 | Parthasarathy |
| 2003/0065614 A1 | 4/2003 | Sweeney |
| 2004/0078320 A1 | 4/2004 | DeFrancesco et al. |
| 2006/0085356 A1* | 4/2006 | Coley et al. ..................... 705/59 |

OTHER PUBLICATIONS

Miki, H., "Designing Awareness for Multipurpose Remote Branch Terminal", Conference: Human-Computer Interaction: Ergonomics and User Interfaces. Proceedings of HC1 Internatiobnal '99 ($8^{th}$ International Conference on Human-Computer Interaction), vol. 2, pp. 553-557.

Kiesnoski, K., "Banks Hatch Plans for Internet-Enabled Machines", Bank Systems & Technology, vol. 37, No. 4, p. 20, Apr. 2000.

Tsuchiya, K. et al., "Development of Automatic Contract Machine System for Financial Solution", Omron Technics, vol. 40, No. 3, 2000, ISSN 0474-1315, pp. 259-262.

Kukyendall, L., "On-the-Spot Issuance Gets an Audition", American Banker Online, May 2004, Thomson Financial.

\* cited by examiner

EVENT MARKETING AUTOMATED SYSTEM

BACKGROUND OF THE INVENTION

1. Field of the Invention

The present invention relates generally to marketing services or products at remote locations, and more particularly to automated processing of consumer applications for services.

2. Related Art

There are a number of methods of attracting potential new customers in service industries such as credit card issuing companies, insurance companies, and other service companies where the customer must apply and be approved before receiving the service. These methods are often inefficient, and can be expensive for the company.

What is needed then is an improved system and method that overcomes shortcomings of conventional solutions.

SUMMARY OF THE INVENTION

In an exemplary embodiment of the present invention a system, method and computer program product for receiving and approving customer applications automatically is disclosed.

In one exemplary embodiment, the present invention may be a method of processing customer applications at an event, comprising: receiving an application from a customer on a customer interface computer; verifying data in the application on the customer interface computer; encrypting the data by the customer interface computer; transmitting wirelessly the encrypted data to a portal computer via a private wireless network; and transmitting the encrypted data from the portal computer to a processing computer system for approval of the application.

In another exemplary embodiment, the present invention may be a computer system for processing customer applications at an event, comprising: means for receiving an application from a customer on a customer interface computer; means for verifying data in the application on the customer interface computer; means for encrypting the data by the customer interface computer; means for transmitting wirelessly the encrypted data to a portal computer via a private wireless network; and means for transmitting the encrypted data from the portal computer to a processing computer system for approval of the application.

In another exemplary embodiment, the present invention may be a method for processing customer applications at an event, comprising: receiving encrypted data for an application over a private wireless network at an event server; verifying the encrypted data; rejecting the application, if appropriate, based on the verifying; receiving event management data from an event manager computer wirelessly over the wireless network; and transmitting wirelessly the encrypted data to a portal computer.

In another exemplary embodiment, the present invention may be a computer system comprising software elements, the software elements comprising program code adapted to cause a computer to perform the steps of: receiving encrypted data for an application over a private wireless network at an event server; verifying the encrypted data; rejecting the application, if appropriate, based on the verifying; receiving event management data from an event manager computer wirelessly over the wireless network; and transmitting wirelessly the encrypted data to a portal computer.

In another exemplary embodiment, the present invention may be a system for processing customer applications at an event, comprising: a wireless network; a plurality of customer interface computers, each adapted to receive customer applications and transmit wirelessly data from the applications on the wireless network; a portal computer, adapted to receive wirelessly and transmit data wirelessly from customer applications on the wireless network; and an event manager computer, adapted to process data regarding a plurality of the applications at the event, and to transmit wirelessly the processed data to the portal computer over the wireless network.

Further features and advantages of the invention, as well as the structure and operation of various embodiments of the invention, are described in detail below with reference to the accompanying drawings.

DEFINITIONS

A "computer" refers to any apparatus that is capable of accepting a structured input, processing the structured input according to prescribed rules, and producing results of the processing as output. Examples of a computer include: any apparatus that accepts data, processes the data in accordance with one or more stored software programs, generates results, and typically includes input, output, storage, arithmetic, logic, and control units; a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a laptop computer; a tablet personal computer; a personal digital assistant (PDA); a portable telephone; and application-specific hardware to emulate a computer and/or software. A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; software programs; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone, wireless, or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

At an event such as, for example, a sporting event, dog show, craft fair, street festival or other venue where booths or tables may be set up, a company seeking new customers, such as, for example, a credit card issuing company, may deploy one or more pods at different physical locations at the event to accept applications for the service, e.g. credit. While the embodiments described below describe an application for credit from a credit card issuing company, the present invention is not limited to credit applications, and may apply to any other transaction where a customer applies for a service and receives an approval decision for that service, such as, for example, insurance approval, consumer finance approval, and product marketing.

Figure 1:
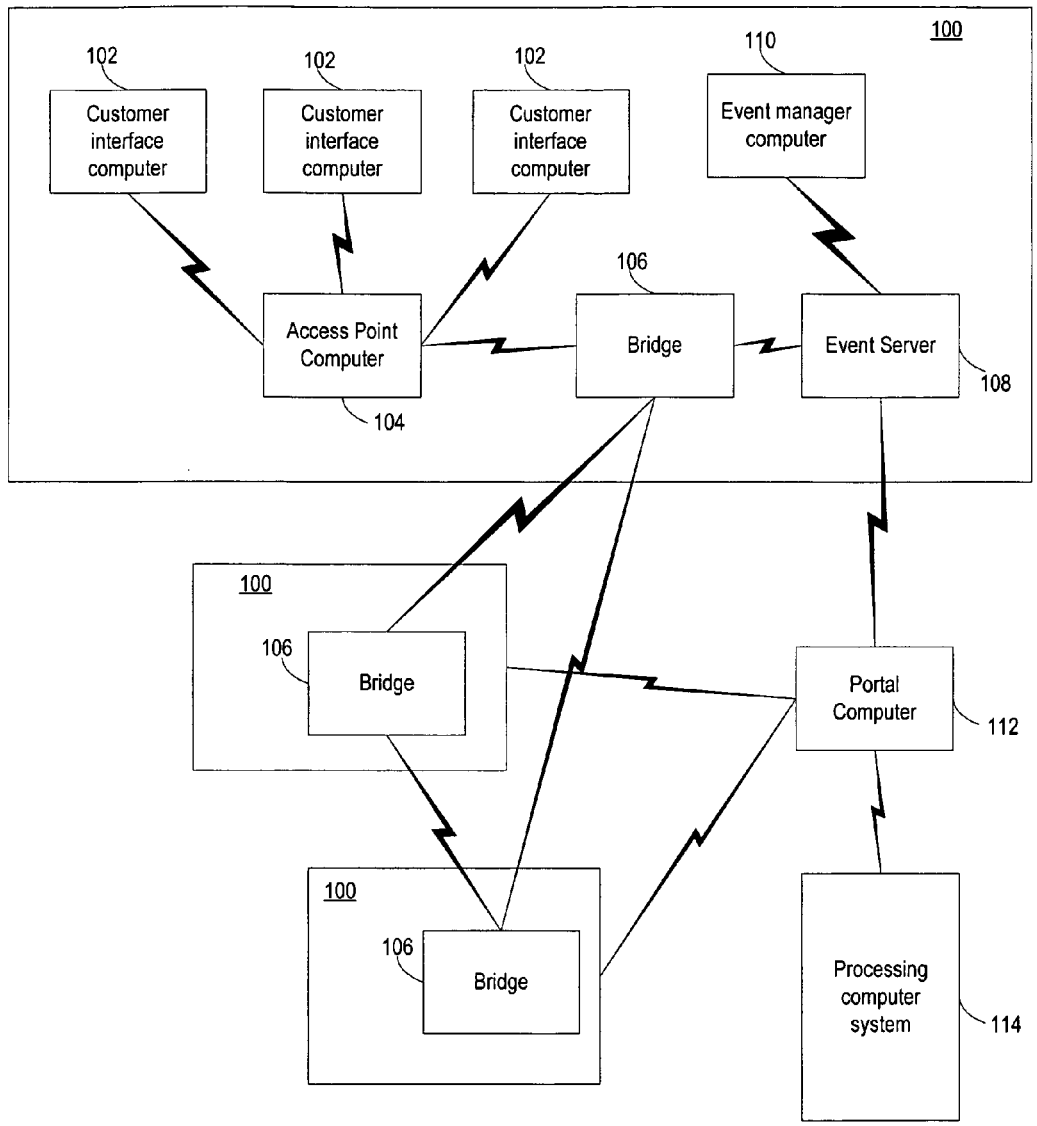
FIG. 1 depicts an exemplary embodiment of a system according to an embodiment of the present invention.

As seen, for example, in FIG. 1, an event includes one or more pods 100. Each pod 100 includes a plurality of customer interface computers 102, an access point computer 104, a bridge 106, an event server 108, and one or more event manager computers 110. A bridge may be a device that couples networks and enables the passing of information from one network to another. Each pod 100 is wirelessly coupled to a portal computer 112. Each pod 100 may communicate with every other pod 100 at the event. Although FIG. 1 depicts three customer interface computers 102 and three pods 100, any number of customer interface computers 102 and pods 100 may be used.

Each pod 100 may be comprised of a plurality of customer interface computers 102, such as a wireless laptop computer or tablet personal computers (PCs), that communicate wirelessly to an access point computer 104. The customer interface computers 102 may be, for example, a commercially available web tablet mobile computer, a commercially available tablet PC from, or a commercially available wireless web based tablet. The customer interface computers 102 may operate, for example, with commercially available operating system. The access point computer 104 may communicate wirelessly with the bridge 106. The bridge 106 in each pod 100 may communicate wirelessly with bridges 106 in other pods 100 (not shown) and with the event server 108. The event server 108 may be, for example, a computer.

A pod 100 also has one or more event manager computers 110 that communicate wirelessly with the event server 108 and with the portal computer 112. The event manager computer 110 may be a personal digital assistant (PDA). Each event manager computer 110 may access the applicant data, as well as data regarding inventory of premiums (e.g. free T-shirts given out with each application), the time needed for data transmission, and the most popular premiums. An event may include one or more types of premiums. The event manager computer data may also be transmitted to the event server 108.

The event server 108 may be in further communication with the portal computer 112, which may be, for example, a large server.

The customer interface computers 102, access point computer 104 and bridge 106 within a pod 100 may communicate wirelessly, for example, on an Ethernet wireless network such as an 802.11b wireless local area network (LAN). The bridge 106 may communicate with the event server 108 or with bridges 106 in other pods 100 at the same event, for example, on a 900 MHz wireless network, or via a satellite network.

The portal computer 112 may communicate with a processing computer system 114. The processing computer system 114 may be a computer system at the credit card issuing company. The processing computer system 114 may be the existing credit application processing system, or other back-end system used to examine and issue credit to consumers. The processing computer system 114 may also be a combination of a third-party computer system and an existing credit application processing system, where the third-party system receives data from the portal computer 112 and forwards the data to the existing credit application processing system. The communication between the portal computer 112 and the processing computer system 114 may be via a wireless private network, or a wired private network.

Figure 2:
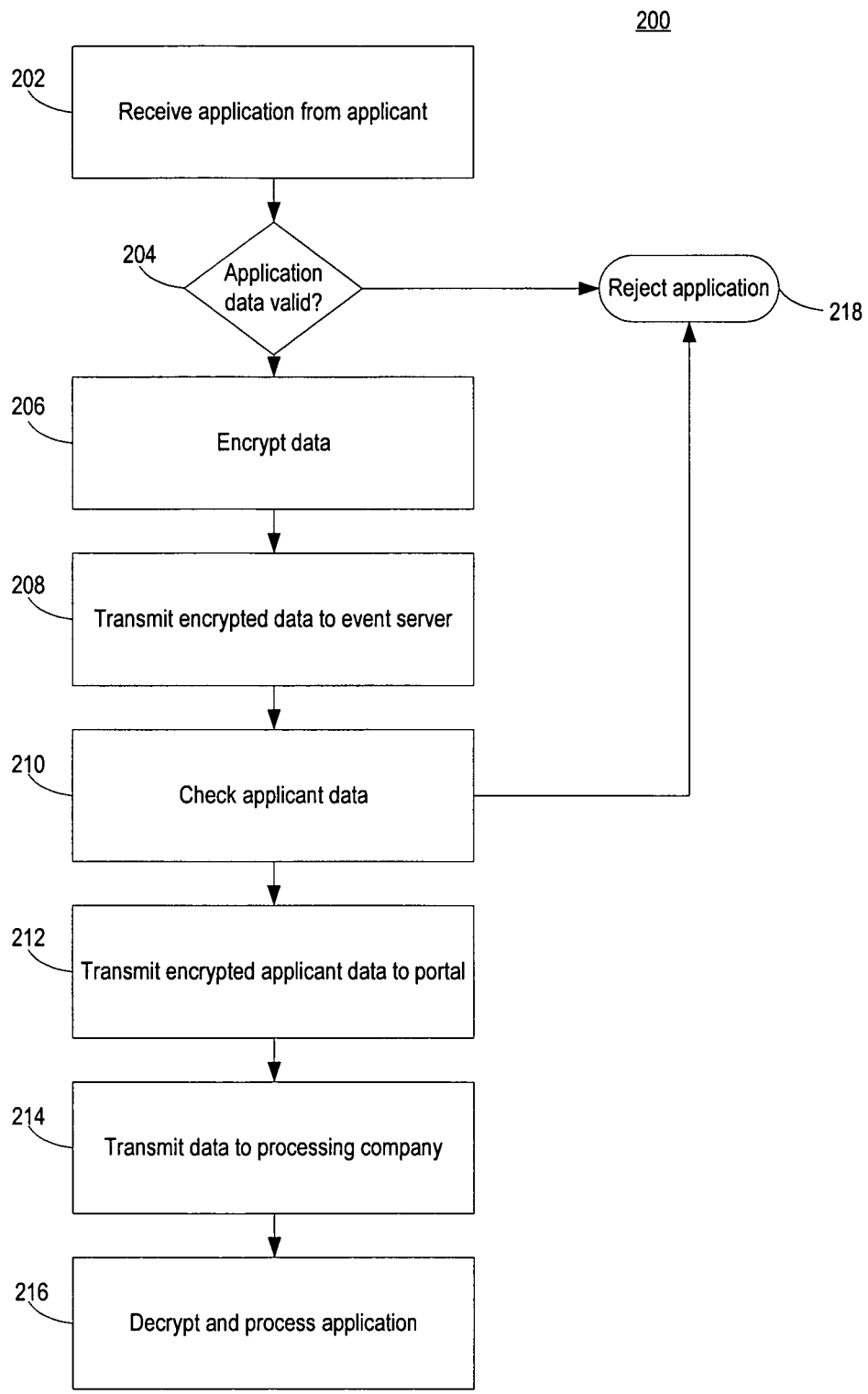
FIG. 2 depicts an exemplary embodiment of a method according to an embodiment of the present invention.

FIG. 2 shows a flowchart 200 illustrating a method of receiving an application for credit from a customer at an event according to an exemplary embodiment of the present invention. In block 202, a customer interface computer 102 receives an application for credit through an interface from an applicant for credit. The customer interface computer 102 performs a validity check, in block 204, to detect false and/or invalid information in such fields as social security numbers, telephone numbers, and birth dates. Applications that fail the validity check are rejected in block 218. Valid applicant information is encrypted by the customer interface computer 102 in block 206. The encryption may be, for example, pretty good privacy (PGP) encryption. The encrypted applicant information is transmitted to the event server 108 through the access point computer 104 and bridge 106 in block 208. The event server 108 checks the applicant's information in block 210, including detecting duplicate applications from the same event and/or over a series of events.

In block 212, the encrypted applicant data and PDA data on the event server 108 are transmitted to the portal 112. PDA data may include, for example, data regarding inventory of premiums, the time needed for data transmission, and the most popular premiums at the event. In block 214, the portal 112 transmits the encrypted data over a network to the processing computer system 114 of the credit card issuing company. The credit card issuing company decrypts the data, and processes the data in the company's normal approval process in block 216. Additionally, the marketing department can access the data to see what happened at the event (e.g., best sales performers, most popular premiums, inventory control).

Credit approvals and inventory assessments can occur within 24 hours or in real time. If approval is granted in real time, the approval is sent from the credit card issuing company to the customer interface computers 102 via the processing computer system 114, the event server 108, the bridge 106, and the access point computer 104.

In an alternate embodiment, the laptop or tablet PC 102 can stand alone, without the event server 108, bridge 106 or access point computer 104, and can communicate directly with the portal 112.

Additionally, a third-party staffing partner may manage deployment of pods 100 at an event. The staffing partner may download event-specific information (e.g. graphics, logos, and the like tied to the event) onto an event manager workstation (not shown), which may be used to set up the event servers 108. The staffing partner may collect data from multiple event servers 108 and transmit the data to the credit card issuing company.

Figure 3:
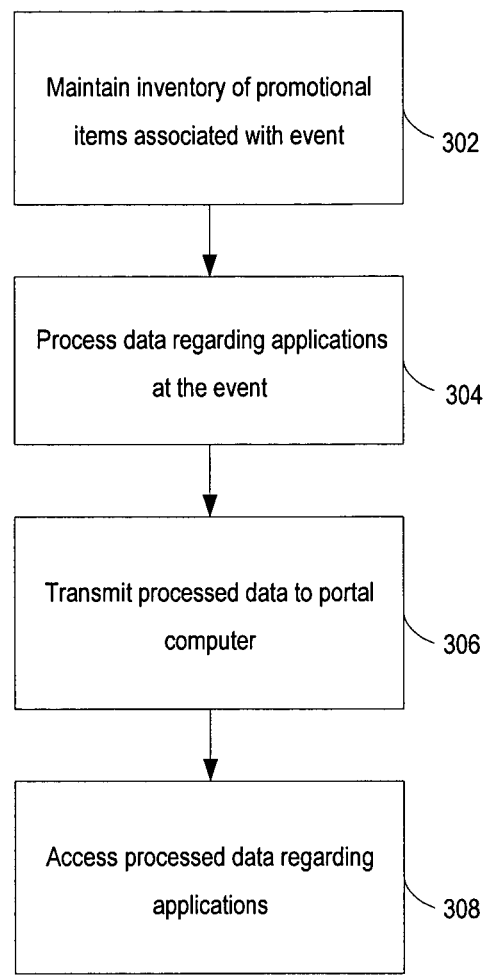
FIG. 3 depicts an exemplary embodiment of an additional method according to an embodiment of the present invention.

FIG. 3 shows a flowchart 300 illustrating a method of managing an event according to an exemplary embodiment of the present invention. The event manager computer 110 may maintain an inventory of the promotional items, or premiums, associated with an event in block 302. The event manager computer 110 may also process data regarding the applications at the event in block 304. Processing data may include, for example, aggregating applicant data, and statistically analyzing applicant or premium data. The processed data may be transmitted wirelessly to the portal computer 112 in block 306. Each event manager computer 110 may access processed data and data regarding the event from other pods 100 in the event and from the event server 108 in block 308.

Figure 4:
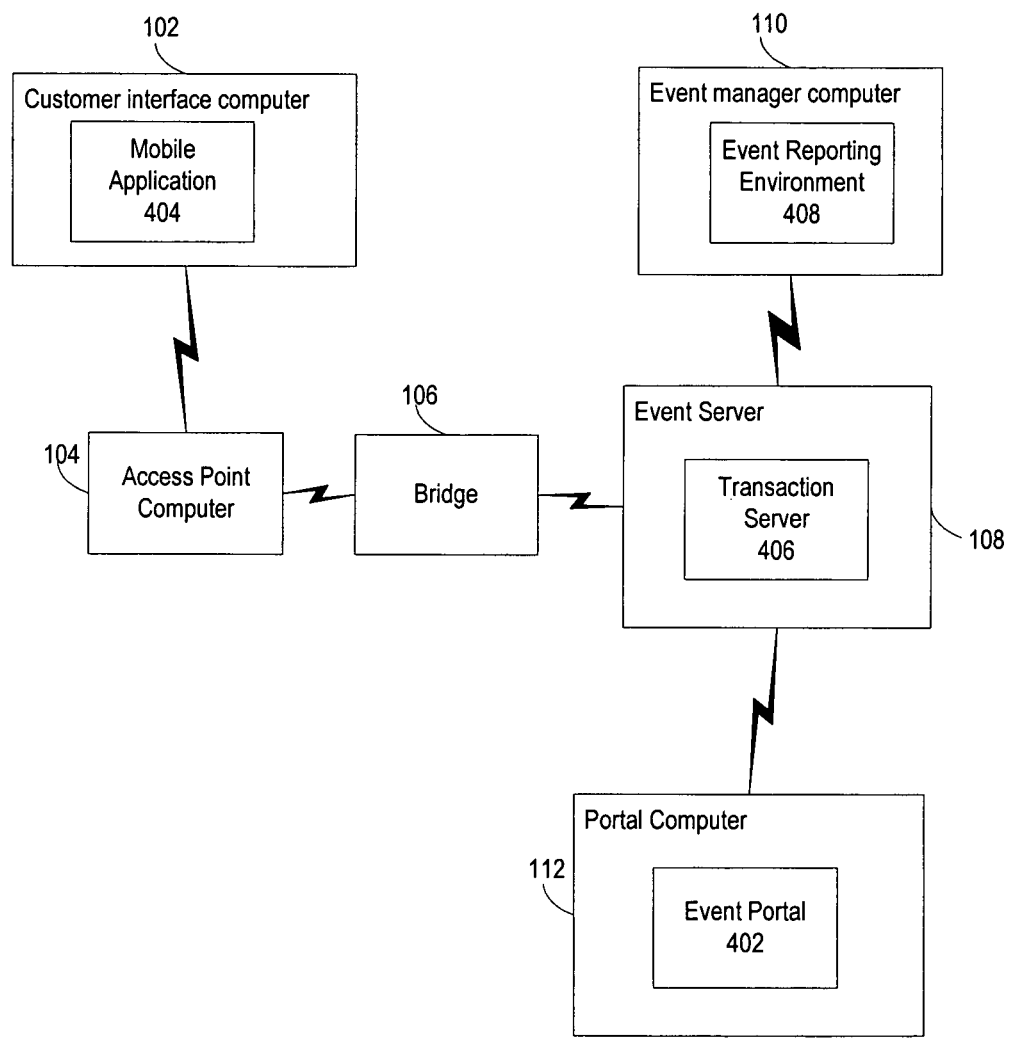
FIG. 4 depicts an exemplary embodiment of software components according to an embodiment of the present invention.

FIG. 4 depicts exemplary software components according to an exemplary embodiment of the present invention. An event portal 402 may run on the portal 112. The event portal 402 may be used to configure event and application executables, define event device and staffing, and needs for event premiums such as, e.g., promotional hats, shirts, key chains, and the like. The event portal 402 may be a web browser-based application, and may be based on a content management server (CMS). The event portal 402 may be accessed through a secure virtual private network (VPN) over a network such as the Internet. Once configured, the event and application executables may be downloaded wirelessly from the event portal 402 to the event server 108.

A mobile application 404 may run on each customer interface computer 102. Each mobile application 404 may run an event executable and an application executable on the respective customer interface computers 102. The mobile application 404 captures and encrypts the data entered by the customer in the credit application. The mobile application 404 may be implemented, for example, using a commercially available software development framework. The application executable may perform the validity check of block 204.

A transaction server 406 may run on each event server 108. The transaction server 406 may provide the server component for uploading transactions between the credit card issuing company and the event servers 108. The transaction server 406 may be, for example, a commercially available server.

An event reporting environment 408 may run on each event manager device 110. Each event reporting environment 408 may provide access to event tracking information, such as, for example, the number of applications received, and which premiums were most popular.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of processing customer applications at an event, comprising:
   (a) receiving an application from a customer on a customer interface computer;
   (b) verifying, within said customer interface computer, data in said application;
   (c) encrypting said data by said customer interface computer;
   (d) transmitting wirelessly said encrypted data to a portal computer via a private wireless network;
   (e) transmitting said encrypted data from said portal computer to a processing computer system for approval of the application;
   (f) maintaining an inventory of promotional items associated with said event on an event manager computer;
   (g) processing data regarding a plurality of said applications at the event on said event manager computer to obtain processed data;
   (h) transmitting wirelessly said processed data from said event manager computer to said portal computer; and
   (i) accessing said processed data regarding said applications with said event manager computer.

2. The method of claim 1, wherein (b) comprises at least one of:
   detecting false information in said application; and
   detecting invalid information in said application.

3. The method of claim 1, wherein (a) comprises receiving an application from a customer on one of a wireless laptop computer and a tablet personal computer.

4. The method of claim 1, wherein (d) further comprises:
   transmitting wirelessly said encrypted data to an access point computer;
   transmitting wirelessly said encrypted data from said access point computer to a wireless bridge;
   transmitting wirelessly said encrypted data from said wireless bridge to an event server; and
   transmitting wirelessly said encrypted data from said event server to said portal.

5. A computer system for processing customer applications at an event, comprising:
   a customer interface computer adapted to receive an application from a customer, verify data in said application, and encrypt said data;
   an event server adapted to transmit wirelessly said encrypted data via a private wireless network;
   a portal computer adapted to receive said encrypted data transmitted by said event server and transmit said encrypted data to a processing computer system for approval of the application; and
   an event manager computer adapted to maintain an inventory of promotional items associated with said event, process data regarding a plurality of said applications at the event to obtain processed data, transmit wirelessly said processed data to said portal computer, and access said processed data regarding said applications.

6. The system of claim 5, wherein said verification of said data in said application comprises at least one of:
   detecting false information in said application; and
   detecting invalid information in said application.

7. The system of claim 5, wherein said customer interface computer is one of a wireless laptop computer and a tablet personal computer.

8. The system of claim 5, wherein the system further comprises:
- an access point computer adapted to receive said encrypted data as a wireless transmission from said customer interface computer; and
- a wireless bridge adapted to receive said encrypted data as a wireless transmission from said access point computer and to transmit wirelessly said encrypted data to said event server.

9. A system comprising:
- a pod;
- a portal computer; and
- a processing computer system,
wherein the pod includes:
- a customer interface computer configured to receive an application from a customer at an event, verify data in said application, and encrypt said verified data;
- an event server configured to receive the encrypted data and transmit the encrypted data to the portal computer; and
- an event manager computer configured to access the encrypted data and maintain an inventory of promotional items associated with said event, process data regarding a plurality of said applications at the event to obtain processed data, transmit wirelessly said processed data to said portal computer, and access said processed data regarding said applications, and wherein the portal computer is configured to receive the encrypted data from the event server and transmit the encrypted data to the processing computer, and wherein the processing computer is configured to receive the encrypted data from the portal computer, decrypt the encrypted data, and process the decrypted data.

10. The system of claim 9, wherein the event server is further configured to detect that the encrypted data indicates the application is not a duplicate of an application previously received at the event, and wherein the event server is configured to transmit the encrypted data to the portal computer responsive to determining that the application is not a duplicate.

* * * * *